(12) United States Patent
Lee et al.

(10) Patent No.: US 9,636,660 B2
(45) Date of Patent: May 2, 2017

(54) PHOTOCATALYST, MANUFACTURING METHOD THEREFOR, AND PHOTOCATALYST APPARATUS

(71) Applicant: LG Hausys, Ltd., Seoul (KR)

(72) Inventors: Dong Il Lee, Anyang-si (KR); Seong Moon Jung, Daejeon (KR); Joo-Hwan Seo, Seoul (KR); Ju-Hyung Lee, Uiwang-si (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 14/400,641

(22) PCT Filed: Dec. 27, 2012

(86) PCT No.: PCT/KR2012/011572
§ 371 (c)(1),
(2) Date: Nov. 12, 2014

(87) PCT Pub. No.: WO2013/176367
PCT Pub. Date: Nov. 28, 2013

(65) Prior Publication Data
US 2015/0099621 A1    Apr. 9, 2015

(30) Foreign Application Priority Data

May 25, 2012   (KR) ........................ 10-2012-0056124

(51) Int. Cl.
| | |
|---|---|
| *B01J 23/68* | (2006.01) |
| *B01J 23/30* | (2006.01) |
| *B01J 23/04* | (2006.01) |
| *B01J 23/02* | (2006.01) |
| *B01J 23/06* | (2006.01) |
| *B01J 23/10* | (2006.01) |
| *B01J 23/22* | (2006.01) |
| *B01J 23/26* | (2006.01) |
| *B01J 23/28* | (2006.01) |
| *B01J 23/34* | (2006.01) |
| *B01J 23/42* | (2006.01) |
| *B01J 23/50* | (2006.01) |
| *B01J 23/52* | (2006.01) |
| *C01G 23/047* | (2006.01) |
| *B01J 37/34* | (2006.01) |
| *B01J 23/72* | (2006.01) |
| *B01J 23/745* | (2006.01) |
| *B01J 23/75* | (2006.01) |
| *B01J 23/755* | (2006.01) |
| *B01J 35/00* | (2006.01) |
| *B01J 35/10* | (2006.01) |
| *B01J 21/06* | (2006.01) |

(52) U.S. Cl.
CPC ........... *B01J 23/687* (2013.01); *B01J 21/063* (2013.01); *B01J 23/02* (2013.01); *B01J 23/04* (2013.01); *B01J 23/06* (2013.01); *B01J 23/10* (2013.01); *B01J 23/22* (2013.01); *B01J 23/26* (2013.01); *B01J 23/28* (2013.01); *B01J 23/30* (2013.01); *B01J 23/34* (2013.01); *B01J 23/42* (2013.01); *B01J 23/50* (2013.01); *B01J 23/52* (2013.01); *B01J 23/72* (2013.01); *B01J 23/745* (2013.01); *B01J 23/75* (2013.01); *B01J 23/755* (2013.01); *B01J 35/004* (2013.01); *B01J 35/006* (2013.01); *B01J 35/108* (2013.01); *B01J 35/1014* (2013.01); *B01J 35/1019* (2013.01); *B01J 37/341* (2013.01); *C01G 23/047* (2013.01)

(58) Field of Classification Search
CPC . B01J 23/687; B01J 23/26; B01J 23/04; B01J 23/28; B01J 23/02; B01J 23/72; B01J 23/745; B01J 23/34; B01J 23/06; B01J 23/52; B01J 23/755; B01J 23/75; B01J 23/22; B01J 23/50; B01J 23/42; B01J 23/10; B01J 23/30; B01J 21/063; B01J 35/1019; B01J 35/006; B01J 35/1014; B01J 35/108; B01J 37/341; C01G 23/047
See application file for complete search history.

(56) References Cited

U.S. PATENT DOCUMENTS

| | | | | |
|---|---|---|---|---|
| 5,853,866 A | * | 12/1998 | Watanabe | .............. B01J 21/063 156/309.6 |
| 6,121,191 A | | 9/2000 | Komatsu et al. | |
| 6,162,278 A | | 12/2000 | Hu | |
| 2005/0129591 A1 | * | 6/2005 | Wei | ........................ A61L 9/205 422/186 |
| 2010/0015193 A1 | * | 1/2010 | Inaoka | .................... A01N 25/34 424/409 |

FOREIGN PATENT DOCUMENTS

| | | |
|---|---|---|
| JP | 8-66635 A | 3/1996 |
| JP | 9-168722 A | 6/1997 |
| JP | 11-71137 A | 3/1999 |
| JP | 11512337 A | 10/1999 |
| JP | 2002-320862 A | 11/2002 |

(Continued)

OTHER PUBLICATIONS

Kuo et al., "Analysis of silver particles incorporated on TiO2 coatings for the photodecomposition of o-cresol," Thin Solid Films 515 (2007) 3461-3468.*

(Continued)

*Primary Examiner* — Anthony J Zimmer
(74) *Attorney, Agent, or Firm* — Hauptman Ham, LLP

(57) ABSTRACT

Provided is a photocatalyst including: a porous metal oxide film; and metal particles formed on a surface of the porous metal oxide film.

8 Claims, 3 Drawing Sheets

(56) References Cited

FOREIGN PATENT DOCUMENTS

| JP | 2003-320257 A | 11/2003 |
| JP | 2008-264611 A | 11/2008 |
| JP | 2009131761 A | 6/2009 |
| KR | 1020070018905 A | 2/2007 |
| KR | 100831650 B1 | 5/2008 |

OTHER PUBLICATIONS

Jinxia Xu et al., Enhanced photocatalysis by coupling of anatase TiO2 film to triangular Ag nanoparticle island, Nanoscale Research Letters, 2012, pp. 1-6, Springer.
International Search Report for PCT/KR2012/011572 mailed on Apr. 5, 2013.
Office Action dated Dec. 2, 2016 from JPO in connection with the counterpart Japanese patent application No. 2015-513877.

\* cited by examiner

PHOTOCATALYST, MANUFACTURING METHOD THEREFOR, AND PHOTOCATALYST APPARATUS

CROSS REFERENCE TO RELATED APPLICATION

This application claims the priority of Korean Patent Application No. 10-2012-0056124 filed on May 25, 2012 in the Korean Patent and Trademark Office. Further, this application is the National Phase application of International Application No. PCT/KR2012/011572filed on Dec. 27, 2012, which is incorporated herein by reference in its entirety.

TECHNICAL FIELD

The present invention relates to a photocatalyst, a method for preparing the same, and a photocatalytic apparatus.

BACKGROUND ART $TiO_2$, which is a representative photocatalytic material, is a safe and non-toxic material exhibiting excellent durability and abrasion resistance, and has a merit of low price. On the other hand, since $TiO_2$ can only absorb light having a wavelength less than that of ultraviolet light due to large band-gap energy thereof, there is a limit in applying $TiO_2$ to interior materials instead of exterior materials. In this regard, a lot of studies into a visible light-active catalyst capable of absorbing visible light have been made for application to interior materials. However, it is difficult to find a consistent result from a lot of studies, and it is particularly difficult to find a visible light-active catalyst having performance verified under actual living conditions.

DISCLOSURE

Technical Problem

It is an aspect of the present invention to provide a visible light-responsive photocatalyst exhibiting excellent efficiency even under an indoor light source.

It is another aspect of the present invention to provide a method for preparing the photocatalyst as set forth above.

It is a further aspect of the present invention to provide a photocatalytic apparatus using the photocatalyst as set forth above.

Technical Solution

In accordance with one aspect of the present invention, a photocatalyst includes: a porous metal oxide film; and metal particles formed on a surface of the porous metal oxide film.

The photocatalyst may be activated by visible light of a wavelength from about 380 nm to about 700 nm The metal particles may form a discontinuous coating layer having island shapes on the surface of the porous metal oxide film.

The island shapes may have an average diameter from about 1 nm to about 10 nm

The discontinuous coating layer may have a thickness from about 0.1 nm to about 10 nm The metal oxide included in the metal oxide film may include at least one selected from among titanium oxide, tungsten oxide, zinc oxide, niobium oxide, and combinations thereof.

The metal particles may include at least one selected from among tungsten, chromium, vanadium, molybdenum, copper, iron, cobalt, manganese, nickel, platinum, gold, silver, cerium, cadmium, zinc, magnesium, calcium, strontium, barium, and combination thereof.

The porous metal oxide film may have a porosity from about 5% to about 50%.

The porous metal oxide film may have a specific surface area from about 50 $m^2/g$ to about 500 $m^2/g$.

The metal particles may be present in an amount of about 0.0001 mg to about 0.01 mg per $cm^2$ of the porous metal oxide film.

The metal particles may be present in an amount of about 0.01% by weight (wt %) to about 10 wt % based on 100 wt % of the photocatalyst.

In accordance with another aspect of the present invention, a method for preparing a photocatalyst includes: forming a porous metal oxide film; and forming a discontinuous coating layer having island shapes by sputtering a metal onto a surface of the metal oxide film.

The metal oxide film may be formed on a substrate by a sol-gel method using a metal oxide precursor, or by coating a slurry including metal oxide powder, a binder and a solvent onto the substrate.

After the metal oxide film is formed by the sol-gel method using the metal oxide precursor or by coating of the slurry including the metal oxide powder, the binder and the solvent, heat treatment may be further performed to impart crystallinity to the metal oxide film or to remove the binder in the metal oxide film.

Sputtering may be performed in an inert gas atmosphere.

Sputtering may be performed at a pressure from about 3 mTorr to about 10 mTorr.

Sputtering may be performed at an applied power from about 100 W to about 1000 W.

In accordance with a further aspect of the present invention, a photocatalytic apparatus includes the photocatalyst as set forth above.

The photocatalytic apparatus may be used for purposes of air cleaning, deodorization, or antimicrobial effects.

Advantageous Effects

The photocatalyst is activated by visible light and has excellent photocatalytic efficiency.

BEST MODE

Figure 1:
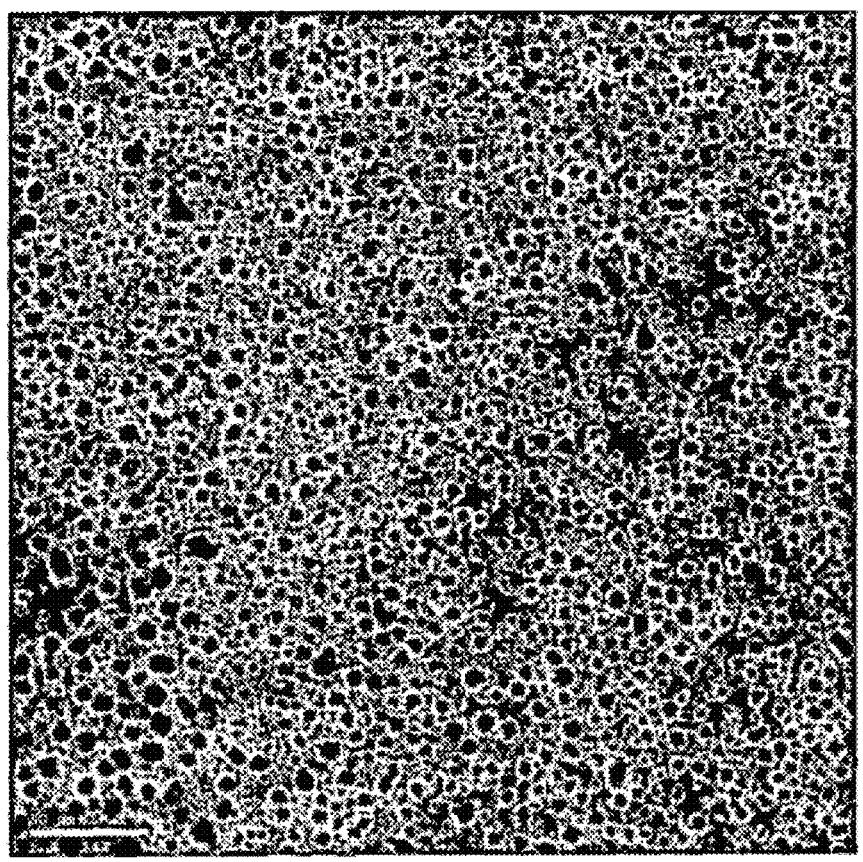
FIG. 1 is a TEM image (magnification, 30,000x) of a surface of a metal particle coating layer side of a photocatalyst prepared in Example 1.

Hereinafter, embodiments of the present invention will be described in detail. However, it should be understood that the following embodiments are provided for illustrative purposes only and are not to be in any way construed as limiting the present invention. The scope and sprit of the present invention should be defined only by the accompanying claims and equivalents thereof.

In accordance with one aspect of the present invention, a photocatalyst includes: a porous metal oxide film; and metal particles formed on a surface of the porous metal oxide film. The metal oxide forming the porous metal oxide film may be any metal oxide used as a photocatalyst in the art without limitation. The metal of the metal particles may include metals capable of imparting activity to visible light to the photocatalyst by doping of the metal oxide therewith. For example, the metal of the metal particles may include transition metals, precious metals, and the like.

The photocatalyst may be activated by visible light of a wavelength from about 380 nm to about 700 nm Visible light absorbance can be calculated as a value obtained by subtracting transmittance and reflectance from 100%. Specifically, the photocatalyst according to the present invention may absorb visible light of a wavelength from about 380 nm to about 700 nm at an absorbance from about 2% to about 20%, as calculated by such a calculation method.

The photocatalyst is a material which can provide air cleaning, deodorization and antimicrobial effects since electrons and holes created by energy obtained by light absorption of the material generate superoxide anions, hydroxyl radicals, or the like. For example, the superoxide anions or hydroxyl radicals generated from the photocatalyst can degrade environmentally harmful substances such as formaldehyde. Since the photocatalyst can exhibit excellent efficiency even under an indoor light source due to visible light absorbance thereof, the photocatalyst requires no separate UV supplying device.

The metal particles may form a discontinuous coating layer having island shapes on a surface of the porous metal oxide film. The island shapes may have an average diameter from about 1 nm to about 10 nm, specifically from about 3 nm to about 8 nm The discontinuous coating layer of the metal particles may be formed by deposition of a metal using sputtering. Since the diameter of the island shapes corresponds to a fine particle size in the above range, the photocatalyst can exhibit further improved activity to visible light. Therefore, the metal particles are preferably fine particles deposited by sputtering, and form the discontinuous coating layer. In addition, since the discontinuous coating layer of the metal particles is formed by sputtering, diameter distribution of the island shapes or the fine metal particles can be kept constant. As such, since the discontinuous coating layer is formed by deposition of the fine metal particles having low-dispersity particle diameter distribution, the island shapes of the discontinuous coating layer also have low-dispersity diameter distribution. For example, the island shapes may have a D50 of about 5 nm or less and a D90 of about 10 nm or less. When the island shapes have distribution of the above range, the photocatalyst can exhibit excellent activity to visible light.

As such, to impart activity to visible light to the photocatalyst, the metal is coated onto the surface of the porous metal oxide film by sputtering for doping of the metal oxide with the metal, thereby forming the metal particles on the surface of the porous metal oxide film. Here, as described above, the metal particles may be uniformly dispersed on the surface of the porous metal oxide film by sputtering. For example, the metal particles may be present in an amount of about 0.0001 mg to about 0.01 mg, specifically about 0.001 mg to about 0.005 mg per cm2 of the porous metal oxide film. The photocatalyst, which is uniformly doped with the metal in an amount within this range, exhibits excellent activity to visible light.

The discontinuous coating layer of the metal particles may have a thickness from about 0.1 nm to about 10 nm If the thickness of the discontinuous coating layer of the metal particles is less than about 0.1 nm, it is difficult to achieve activity to visible light, and if the thickness of the discontinuous coating layer of the metal particles is greater than about 10 nm, there is a problem in that light absorption of the metal oxide photocatalyst is not facilitated due to formation of a continuous layer of the metal particles.

For example, the metal particles may be present in an amount of about 0.01 wt % to about 10 wt % based on 100 wt % of the photocatalyst. If the amount of the metal particles is less than about 0.01 wt %, it is difficult to anticipate effects due to addition of the metal particles, and if the amount of the metal particles is greater than about 10 wt %, the metal particles can inhibit light absorption of the metal oxide photocatalyst.

The metal may include at least one selected from among tungsten, chromium, vanadium, molybdenum, copper, iron, cobalt, manganese, nickel, platinum, gold, silver, cerium, cadmium, zinc, magnesium, calcium, strontium, barium, and combinations thereof.

The metal oxide included in the metal oxide film may include at least one selected from among titanium oxide, tungsten oxide, zinc oxide, niobium oxide, and combinations thereof.

The porous metal oxide film may have a porosity from about 5% to about 50%. Within this range, the photocatalyst can exhibit excellent activity to visible light. If the porous metal oxide film does not have porosity and is densely formed by sputtering or the like, it is difficult to anticipate excellent activity of the photocatalyst due to inefficient adsorption of reactants such as formaldehyde and the like.

The porous metal oxide film may have a specific surface area from about 50 $m^2/g$ to about 500 $m^2/g$. Within this range, the photocatalyst can exhibit excellent activity to visible light.

In accordance with another aspect of the present invention, a method for preparing a photocatalyst includes: forming a porous metal oxide film; and forming a discontinuous coating layer of an island shape by sputtering a metal onto a surface of the metal oxide film.

The aforementioned photocatalyst may be prepared by a method for preparing a photocatalyst.

For example, a porous metal oxide film may be formed on a substrate by a solution method. For example, the substrate may be a glass substrate.

In one embodiment, the metal oxide film may be formed on the substrate by a sol-gel method using a metal oxide precursor. Specifically, a solution including the metal oxide precursor may be coated in a sol form, followed by drying, and then subjected to heat treatment, thereby forming a crystalline film. For example, first, the solution, which includes the metal oxide precursor, such as metal alkoxide and the like, alcohol, acid and the like, may be prepared, followed by hydrolysis. Next, the solution may be subjected to dehydration and de-alcoholization to obtain the sol-state solution, followed by coating the sol-state solution onto a flat substrate. The sol-gel method may be performed under any process conditions known in the art without limitation.

In another embodiment, first, the metal oxide film may be formed by coating a slurry including metal oxide powder, a binder and a solvent onto a substrate. As such, the metal oxide film may also be formed by slurry coating under any process conditions known in the art without limitation. The binder is used to secure the metal oxide to the substrate. For example, the binder may be a resin, and may be removed by heat treatment after the slurry is coated onto the substrate.

Specifically, sputtering may be performed in an inert gas atmosphere, such as argon and the like, at a process pressure from about 1 mTorr to about 10 mTorr and at an applied power from 200 W to 1000 W for several seconds to several minutes.

In the method for preparing a photocatalyst, since the metal is deposited by sputtering and thus forms the discontinuous coating layer on the porous metal oxide film, there is a merit in that it is possible to perform uniform coating on a large-area substrate, and the metal particles can be uniformly dispersed to a nanometer size, thereby forming the coating layer. A photocatalyst prepared by the method for preparing a photocatalyst can exhibit further improved activity to visible light.

In accordance with a further aspect of the present invention, a photocatalytic apparatus includes the photocatalyst as set forth above. For example, the photocatalytic apparatus may be manufactured as an apparatus for purposes of air cleaning, deodorization, or antimicrobial effects.

Hereinafter, the present invention will be described in more detail with reference to some examples. It should be understood that these examples are provided for illustration only and are not to be in any way construed as limiting the present invention.

EXAMPLE

Example 1

P25 (Degussa Co., Ltd.) was used as the $TiO_2$. The P25 was dispersed in isopropanol, thereby preparing a P25/isopropanol slurry having a concentration of 5 wt %. The slurry was treated with a homogenizer for 30 minutes, thereby obtaining a uniform dispersion. The uniform dispersion was coated onto 0.7t Na-free glass. An amount of coating was 1 g/m$^2$ in terms of the P25. The $TiO_2$-coated glass was subjected to sputtering, thereby forming a Ag coating layer having discontinuous island shapes. Using Ag metal as a target, deposition was performed at a process pressure of 3 mTorr at a DC power of 500 W for 5 seconds while argon gas as an inert gas was injected at a rate of 100 cc/min As such, an Ag/$TiO_2$ photocatalyst was prepared. The metal oxide of the prepared photocatalyst had a porosity of about 20% and a specific surface area of about 56 m$^2$/g; and the Ag metal particles were present in an amount of 0.6 wt % in the photocatalyst, and were present in an amount of 0.0026 mg/cm$^2$ of the porous metal oxide ($TiO_2$) film. The island-shaped Ag coating layer had a thickness of 1 nm, as measured by a TEM (JEM-2010, JEOL Co., Ltd.).

Example 2

A Ag/$WO_3$ photocatalyst was prepared in the same manner as in Example 1 except that $WO_3$ powder (Aldrich Co., Ltd.) was used instead of $TiO_2$. The metal oxide of the prepared photocatalyst had a porosity of about 20% and a specific surface area of about 52 m$^2$/g; and the Ag metal particles were present in an amount of 0.4 wt % in the photocatalyst, and were present in an amount of 0.0026 mg/cm$^2$ of the porous metal oxide ($WO_3$) film. The island-shaped Ag coating layer had a thickness of 1 nm, as measured by a TEM (JEM-2010, JEOL Co., Ltd.).

Comparative Example 1

A photocatalyst was prepared in the same manner as in Example 1 except that the Ag coating layer was not formed after the porous $TiO_2$ film was prepared.

Comparative Example 2

A photocatalyst was prepared in the same manner as in Example 2 except that the Ag coating layer was not formed after the porous $WO_3$ film was prepared.

Comparative Example 3

142 g of titanium (IV) isopropoxide, 72 g of isopropanol and 10 g of diacetyl methane were reacted at room temperature in a first reactor for 30 minutes. 760 g of distilled water, 1.4 g of iron nitrate, 2.6 g of zinc nitrate and 1.8 g of copper nitrate were placed in a second reactor, followed by stirring at 400 rpm, thereby completely dissolving the metal salts. The liquid of the first reactor was slowly introduced into the second reactor, followed by dropwise addition of 1.6 g of nitric acid. Next, the second reactor was heated to a temperature of 80° C., followed by reaction for 3 hours. Finally, 7.6 g of triethyl orthosilicate was introduced into the second reactor, followed by reaction for 1 hour, thereby preparing a transparent titanium dioxide photocatalyst activared by visible light.

Figure 2:
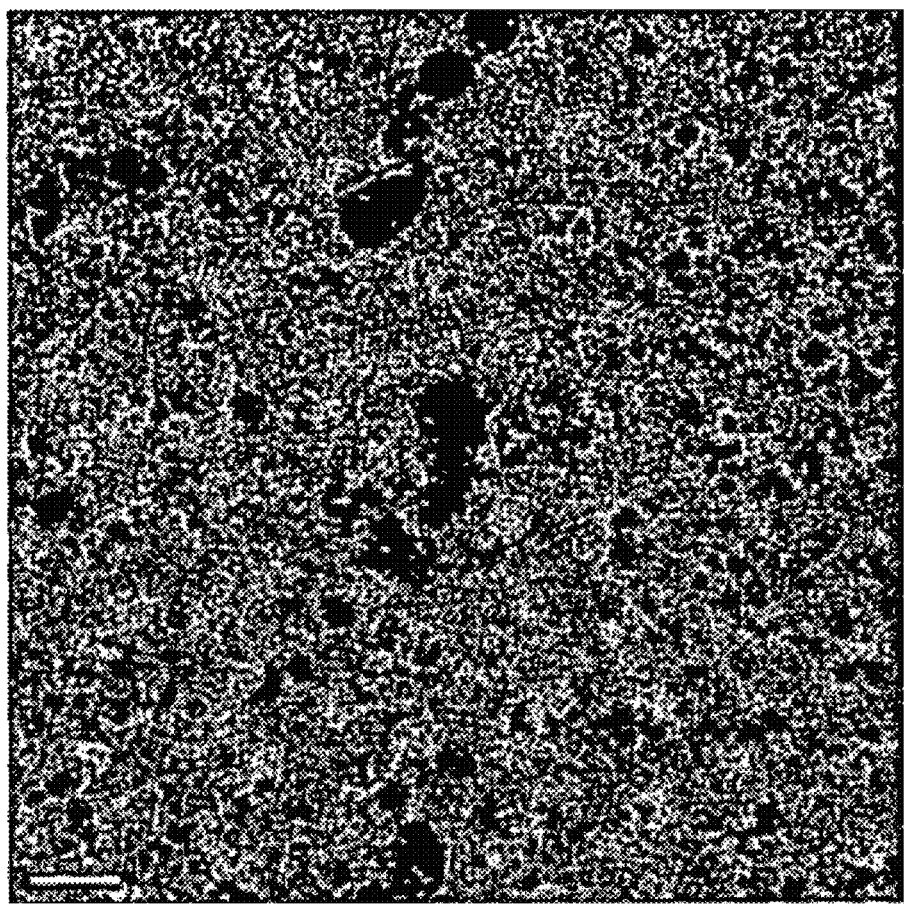
FIG. 2 is a TEM image ((magnification, 100,000x) of a surface of a metal particle coating layer side of a photocatalyst prepared in Example 1.

FIG. 1 is a TEM image (magnification, 30,000x) of a surface of a Ag coating layer side of the photocatalyst prepared in Example 1, and FIG. 2 is TEM image ((magnification, 100,000x) of the surface of the Ag coating layer side of the photocatalyst prepared in Example 1. From FIGS. 1 and 2, it can be confirmed that the metal particles formed on the surface of the porous metal oxide had an average diameter of about 5 nm Experimental Example 1

The photocatalysts prepared in Examples 1 to 2 and Comparative Examples 1 to 2 were evaluated as to UV and visible light absorbances depending on wavelengths. Measurement was performed at a wavelength from 300 nm to 780 nm, and absorbance was calculated as a value obtained by subtracting transmittance and reflectance from 100%.

Figure 3:
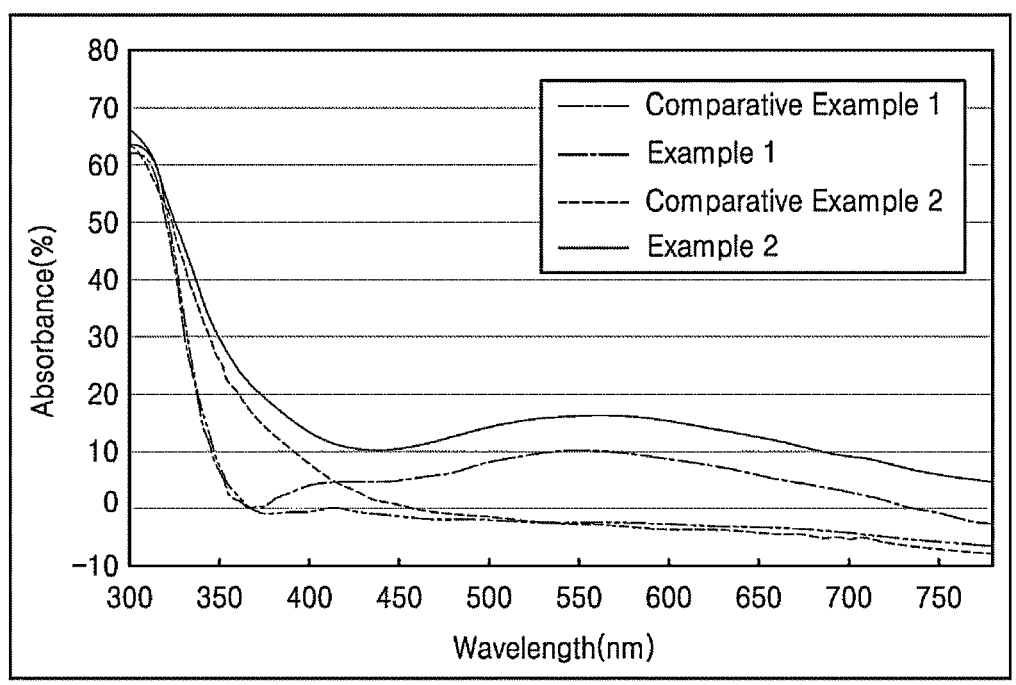
FIG. 3 is a graph depicting UV and visible light absorbances of photocatalysts of Examples 1 to 2 and Comparative Examples 1 to 2.

FIG. 3 shows results of UV and visible light absorbances calculated from measurement results of transmittance and reflectance of the photocatalysts of Examples 1 to 2 and Comparative Examples 1 to 2 using a Solidspec-3700 (Shimadzu Co., Ltd.).

Experimental Example 2

The photocatalysts of Example 1 and Comparative Example 3 were evaluated as to formaldehyde removal performance. Each of the photocatalyst-coated glasses (165 mm×165 mm×0.7 mm) manufactured in Example 1 and Comparative Example 3 was mounted in a 20 L chamber (ADTEC Co., Ltd.), followed by allowing clean air having a formaldehyde concentration of 0.08 ppm to continuously flow at a flow rate of 167 cc/min, thereby setting the number of ventilation times to 0.5 times/hr. A 10 W fluorescent lamp was used as a light source and was set to an illuminance of 1000 lux. The formaldehyde concentration was measured before and after clean air passed through the chamber, thereby calculating a formaldehyde removal rate. Calculation results are shown in Table 1. As for concentration, 10 L of the clean air was concentrated using a 2,4-dinitrophenylhydrazine (DNPH) cartridge, thereby analyzing concentration using a high-performance liquid chromatography (HLPC) apparatus (Agilent Co., Ltd.).

TABLE 1

| | Formaldehyde removal rate |
|---|---|
| Example 1 | 81% |
| Example 2 | 85% |
| Comparative Example 1 | 0 |
| Comparative Example 2 | 0 |
| Comparative Example 3 | 0% |

The invention claimed is:

1. A photocatalyst comprising:
a porous metal oxide film consisting of a metal oxide; and
metal particles formed on a surface of the porous metal oxide film,
wherein the photocatalyst capable of activation by visible light of a wavelength from 380 nm to 700 nm,
wherein the photocatalyst has a specific surface area from 50 m$^2$/g to 500 m$^2$/g,
wherein the metal particles are present in an amount of 0.0001 mg to 0.01 mg per 1 cm$^2$ of the porous metal oxide film,
wherein the metal particles form a discontinuous coating layer having island shapes on the surface of the porous metal oxide film, and the island shapes have an average diameter from 3 nm to 8 nm; and wherein the metal particles comprise at least one selected from the group consisting of tungsten, chromium, vanadium, molybdenum, copper, iron, cobalt, manganese, nickel, silver, cerium, cadmium, zinc, magnesium, calcium, strontium, barium, and combinations thereof.

2. The photocatalyst according to claim 1, wherein the discontinuous coating layer has a thickness from 0.1 nm to 10 nm.

3. The photocatalyst according to claim 1, wherein the metal oxide in the metal oxide film comprises at least one selected from the group consisting of titanium oxide, tungsten oxide, zinc oxide, niobium oxide, and combinations thereof.

4. The photocatalyst according to claim 1, wherein the porous metal oxide film has a porosity from 5% to 50%.

5. The photocatalyst according to claim 1, wherein the metal particles are present in an amount of 0.01 wt % to 10 wt % based on 100 wt % of the photocatalyst.

6. A photocatalytic apparatus comprising the photocatalyst according to claim 1.

7. The photocatalyst according to claim 1, wherein the metal oxide in the metal oxide film is titanium oxide or tungsten oxide.

8. The photocatalyst according to claim 1, wherein the photocatalyst has an absorbance of the visible light of the wavelength from 380 nm to 700 nm from 2% to 20%.

* * * * *